United States Patent [19]

Boxum

[11] Patent Number: 4,628,702
[45] Date of Patent: Dec. 16, 1986

[54] EXHAUST APPARATUS FOR RECREATIONAL VEHICLE AIR CONDITIONER

[75] Inventor: Bruce L. Boxum, Sedgwick, Kans.

[73] Assignee: The Coleman Company, Inc., Wichita, Kans.

[21] Appl. No.: 768,063

[22] Filed: Aug. 22, 1985

[51] Int. Cl.$^4$ .............................................. B60H 1/32
[52] U.S. Cl. ...................... 62/244; 62/411; 62/DIG. 16
[58] Field of Search ............... 62/244, DIG. 16, 410, 62/411, 262, 263; 98/2.14, 42.02, 42.09, 42.12, 116, 94.2

[56] References Cited

U.S. PATENT DOCUMENTS

| | | | |
|---|---|---|---|
| 1,983,979 | 12/1934 | Graham | 98/2.14 |
| 2,100,834 | 11/1937 | Chapman | 62/411 |
| 2,908,147 | 10/1959 | Powers | 62/411 X |
| 3,315,488 | 4/1967 | Lind | 62/DIG. 16 |
| 3,479,947 | 11/1969 | Myers | 98/42.09 X |
| 3,659,432 | 5/1972 | Selhost | 62/262 X |
| 3,973,620 | 8/1976 | Stringer . | |
| 4,478,053 | 10/1984 | Yano et al. | 62/262 |

Primary Examiner—William E. Wayner

[57] ABSTRACT

An air conditioner for a recreational vehicle is provided with an exhaust apparatus for exhausting air from the interior of the vehicle when the air conditioner is not operating. The air conditioner includes a housing mounted on the vehicle and evaporator and condenser coils. A duct or opening in the housing and the vehicle communicate the evaporator coil with the interior of the vehicle for delivering conditioned air to the vehicle. The housing is provided with an exhaust opening, and an exhaust blower is mounted on the housing adjacent the exhaust opening. A door is hingedly mounted on the housing to open and close the exhaust opening.

6 Claims, 8 Drawing Figures

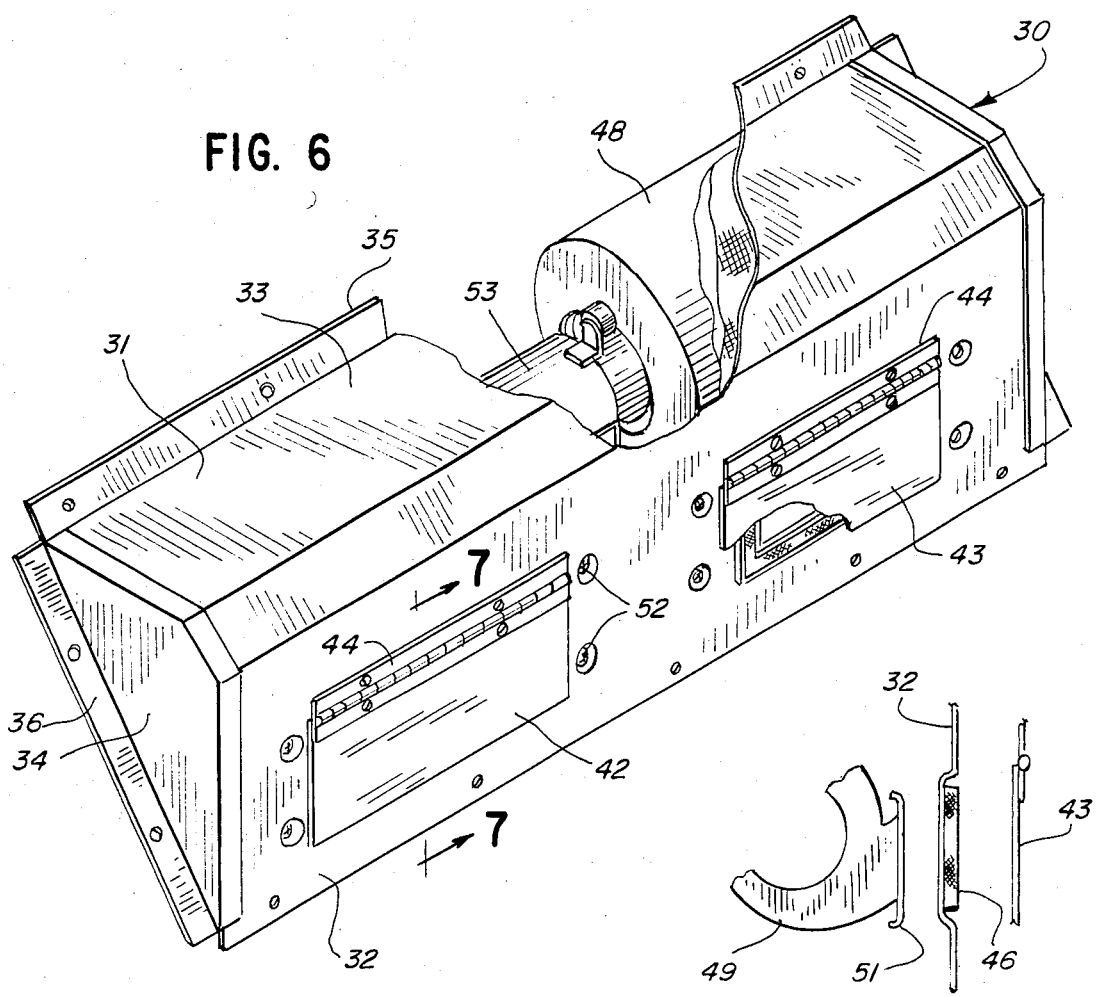
FIG. 6
FIG. 7
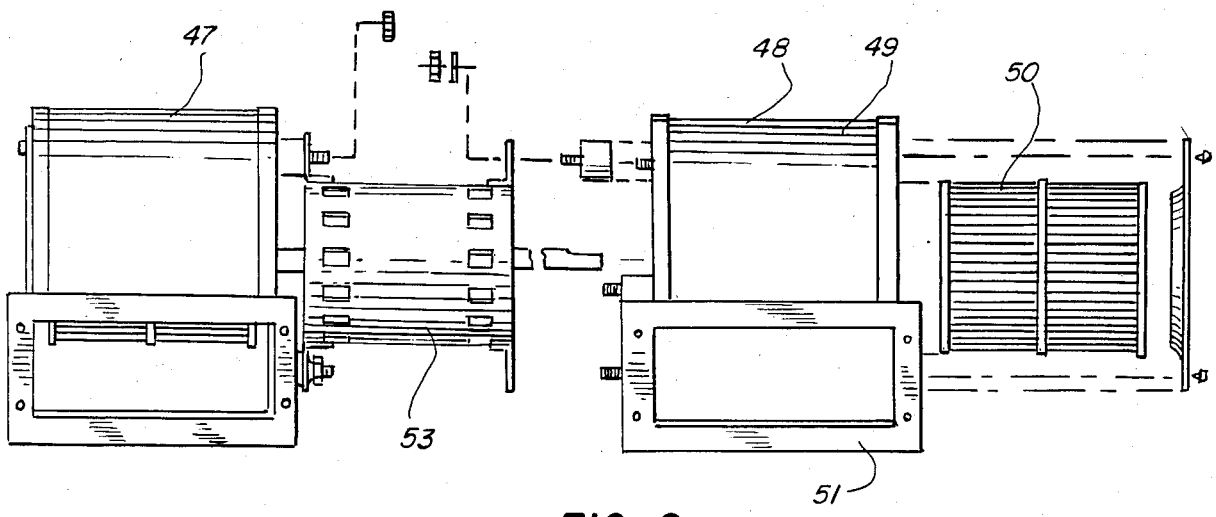
FIG. 8

EXHAUST APPARATUS FOR RECREATIONAL VEHICLE AIR CONDITIONER

BACKGROUND AND SUMMARY

This invention relates to an air conditioner for a recreational vehicle. As used herein, the term "recreational vehicle" is used broadly to refer to mobile homes, motor homes, travel trailers, vans, and other vehicles in which air conditioning is provided by mounting an air conditioner on the exterior of the vehicle.

Typically, an air conditioner for a recreational vehicle is mounted on the roof of the vehicle. An opening is made in the roof for delivering conditioned air from the evaporator coil of the air conditioner to the interior of the vehicle.

The invention provides an exhaust apparatus for the air conditioner for withdrawing stale air from the interior of the vehicle when the air conditioner is not operating. The exhaust apparatus includes a blower which is mounted on the housing of the air conditioner adjacent an exhaust opening in the housing. A door is hingedly mounted on the housing for opening and closing the exhaust opening, and a spring maintains the door closed when the blower is not operating. When the blower is operating, the air force created by the blower opens the door, and the blower draws air into the housing from the interior of the vehicle and exhausts it through the exhaust opening.

Air is exhausted from the vehicle through the opening for the air conditioner, and no additional holes are required. Since the exhaust apparatus is mounted on the air conditioner housing, no additional components are added to the vehicle roof on either the inside or outside of the vehicle.

DESCRIPTION OF THE DRAWING

The invention will be explained in conjunction with an illustrative embodiment shown in the accompanying drawing, in which—

FIG. 6 is an enlarged perspective view, partially broken away, of the exhaust apparatus;

FIG. 7 is an exploded fragmentary sectional view taken along the line 7—7 of FIG. 6; and FIG. 8 is a front elevational view, partially exploded, of the exhaust blowers.

DESCRIPTION OF SPECIFIC EMBODIMENT

Figure 1:
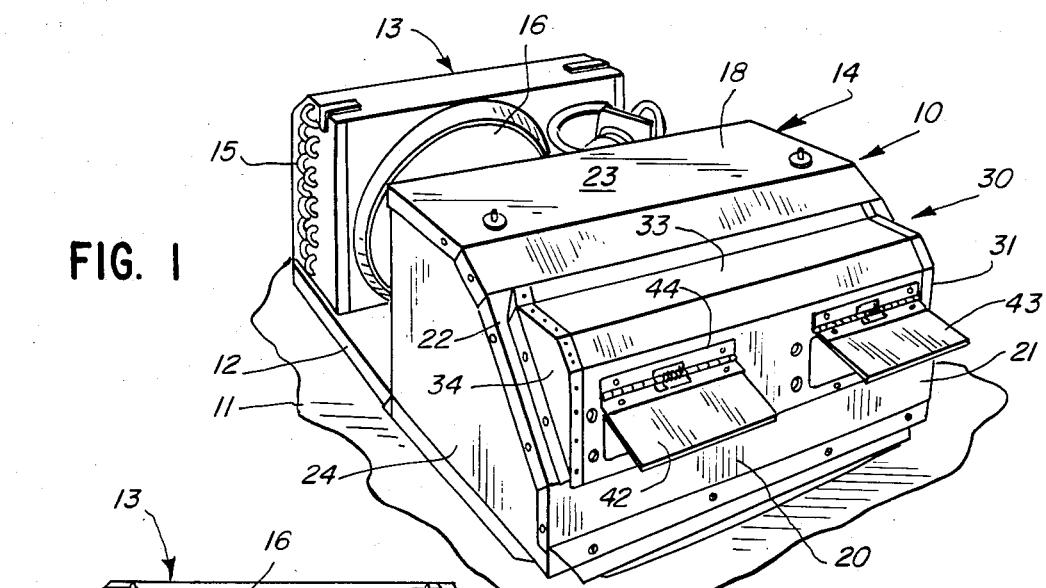
FIG. 1 is a side perspective view of a recreational vehicle air conditioner which is equipped with an exhaust apparatus in accordance with the invention.
Figure 2:
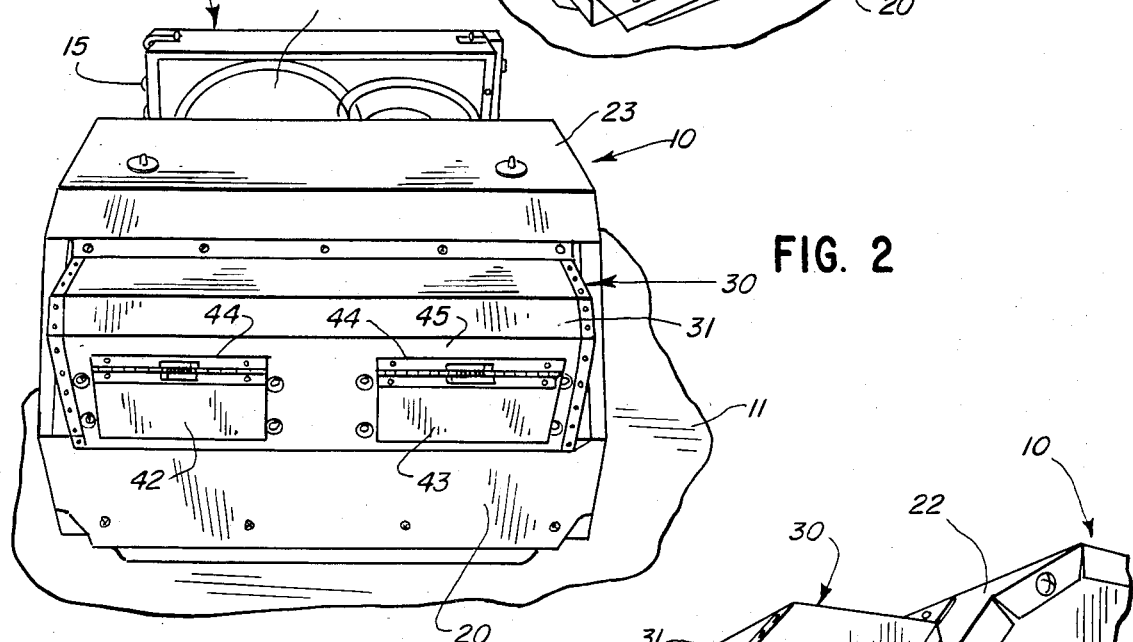
FIG. 2 is a front perspective view of the air conditioner.
Figure 3:
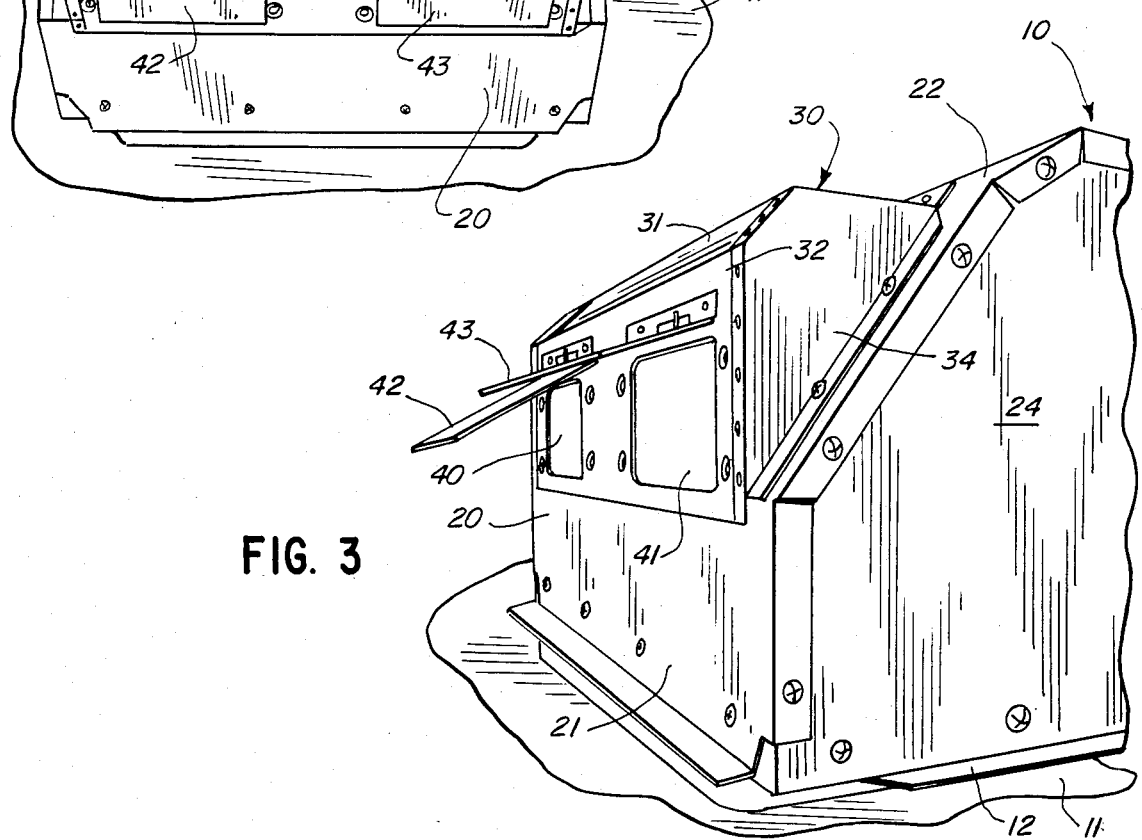
FIG. 3 is a fragmentary side perspective view of the air conditioner.

Referring to FIGS. 1–3, an air conditioner 10 is mounted on the roof 11 of a recreational vehicle. Except for the exhaust apparatus which will be described hereinafter, the air conditioner is conventional. The exterior shroud or housing of the air conditioner is omitted for clarity of illustration.

Figure 4:
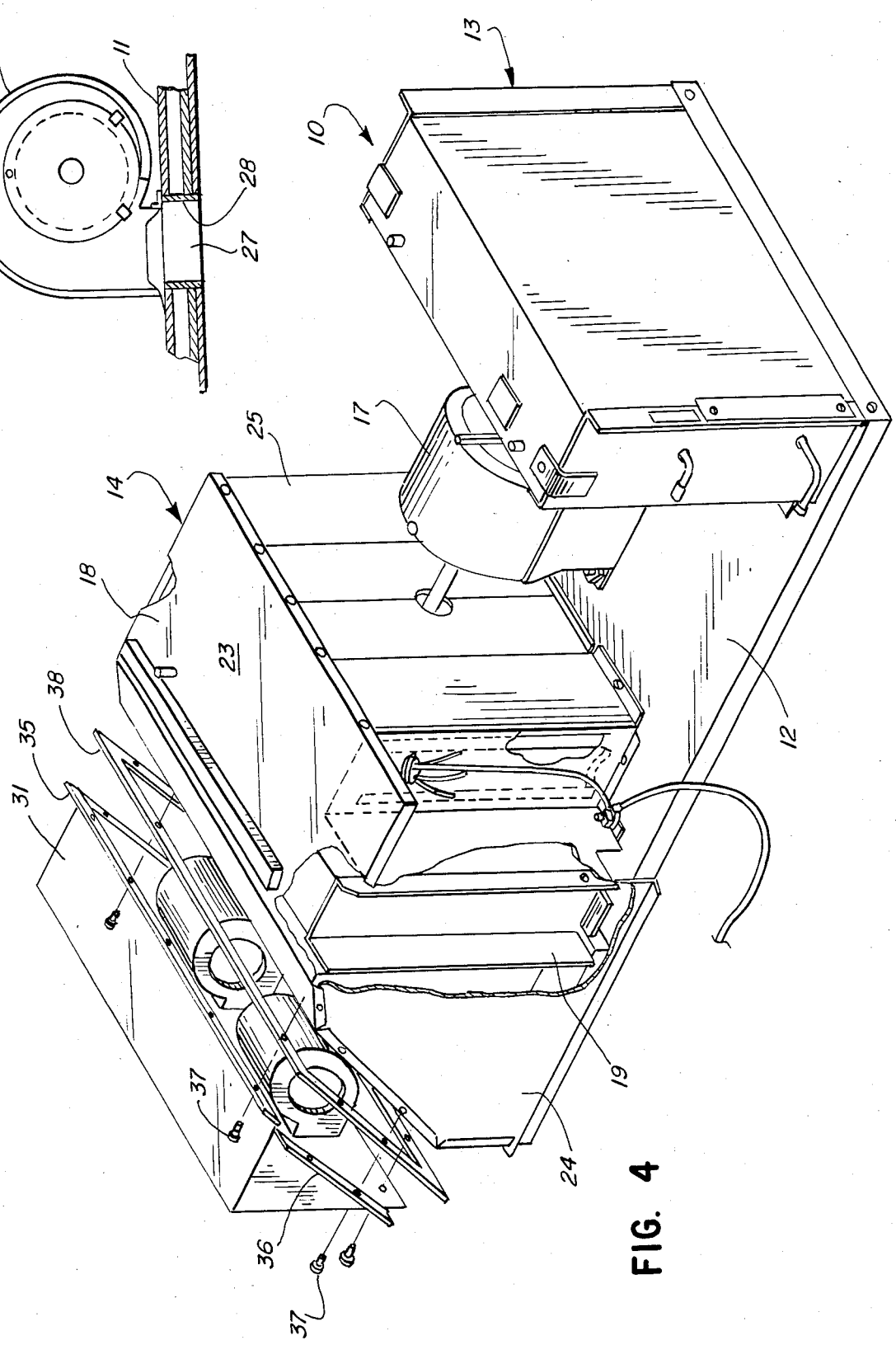
FIG. 4 is a perspective view of the air conditioner, partially broken away, showing the exhaust apparatus in an exploded condition.

The air conditioner includes a base 12 which is attached to the roof of the vehicle, a condensor coil assembly 13, and an evaporator coil assembly 14. The condensor assembly includes a condensor coil 15 and a fan 16 which is driven by a motor 17 (FIG. 4). A refrigerant compressor (not shown) is mounted on the base between the condensor and the evaporator assemblies.

Figure 5:
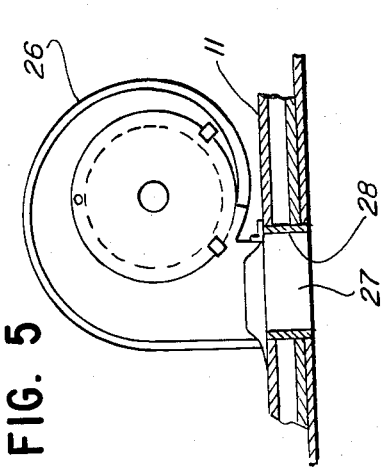
FIG. 5 is a sectional view of the air conditioner blower for delivering conditioned air to the interior of the vehicle.

The evaporator assembly includes a housing 18 which encloses the evaporator coil 19 (FIG. 4). The housing 18 includes a front wall 20 which has a vertical lower portion 21 and an inclined upper portion 22, a top wall 23, side walls 24, and a rear wall 25. Referring to FIG. 5, a squirrel cage blower 26 is mounted on the base 12 within the housing 18 and is also driven by the motor 17. The roof 11 of the vehicle is provided with an opening 27, and a duct 28 connects the outlet of the blower to the interior of the vehicle. The blower draws air from the interior of the vehicle through an outlet opening in the roof (not shown) and past the evaporator coil, and delivers the conditioned air through the inlet opening 27.

The roof-mounted air conditioner heretofore described is conventional and well known in the art, and additional details are unnecessary.

An exhaust apparatus 30 is mounted on the front wall 20 of the air conditioner housing 18. The exhaust apparatus includes an exhaust housing 31 which covers a rectangular opening in the inclined wall 22 of the air conditioner housing. The exhaust housing 31 has a vertical front wall 32, a horizontal top wall 33, and side walls 34. The top wall and side walls terminate in attaching flanges 35 and 36, respectively (FIG. 6), for attaching the exhaust housing to the inclined wall 22 of the air conditioner housing with screws 37 (FIG. 4). The bottom edge of the front wall 32 is attached to the horizontal portion 21 of the air conditioner housing. A rectangular gasket 38 provides a seal between the exhaust housing and the air conditioner housing.

A pair of rectangular exhaust openings 40 and 41 (FIG. 3) in the front wall of the exhaust housing are covered by doors 42 and 43. The doors are mounted on hinges 44 and are resiliently biased to a closed position by springs 45. Referring to FIG. 7, the front wall of the exhaust housing is embossed inwardly around each of the exhaust openings, and a gasket 46 is mounted in the embossment.

A pair of squirrel cage exhaust blowers 47 and 48 are mounted on the front wall of the exhaust housing. Referring to FIG. 8, each of the exhaust blowers includes a housing 49 and a blower wheel 50. A rectangular mounting flange 51 on the housing surrounds the exhaust opening in the front wall 32 of the exhaust housing and is attached by screws 52 (FIG. 6). The blower wheels are driven by a motor 53 which is mounted between the blower housings.

When the air conditioner is being operated, the exhaust doors 42 and 43 are maintained closed by the spring-loaded hinges, and the air conditioner operates in the normal manner. The air conditioner blower draws interior air from the vehicle into the housing 18 of the evaporator coil assembly and delivers conditioned air to the interior of the vehicle through the ceiling opening 27 (FIG. 5). The controls for the air conditioner and exhaust apparatus prevent operation of the exhaust blower when the air conditioner is operating.

When the air conditioner is turned off, the motor 53 for the exhaust blowers 47 and 48 can be operated. The force of the exhaust blowers opens the doors 42 and 43, and the exhaust blowers draw stale interior air from the vehicle through the ceiling openings into the evaporator housing 18. The air is exhausted through the exhaust openings. When the exhaust blowers are turned off, the spring-loaded exhaust doors close.

While in the foregoing specification a detailed description of a specific embodiment of the invention has been set forth for the purpose of illustration, it will be understood that many of the details herein given may be varied considerably by those skilled in the art without departing from the spirit and scope of the invention.

I claim:

1. In combination with a recreational vehicle air conditioner, the air conditioner including an evaporator coil, a condensor coil, a main housing enclosing the evaporator coil, and duct means communicating the evaporator coil with the interior of the vehicle, the improvement comprising exhaust apparatus comprising a blower housing mounted on the main housing adjacent an exhaust opening in the housing containing a blower and closure means on the blower housing for opening and closing the exhaust opening whereby the blower can draw air from the interior of the vehicle through the duct means and through the exhaust opening.

2. The structure of claim 1 in which the closure means comprises a door hingedly mounted on the blower housing and a spring for resiliently biasing the door to a closed position whereby the door will be closed when the blower is not operating.

3. The structure of claim 1 in which the blower is a squirrel cage blower.

4. The structure of claim 1 including a second blower mounted in the blower housing adjacent a second exhaust opening and closure means on the blower housing for opening and closing the second exhaust opening.

5. The structure of claim 4 in which each of the blowers is a squirrel cage blower, and a motor between the blowers for operating the blowers.

6. The structure of claim 5 in which each of the closure means comprises a door hingedly mounted on the blower housing and a spring for resiliently biasing the door to a closed position whereby the door will be closed when the blower is not operating.

* * * * *